March 8, 1955 W. A. BAECHLE 2,703,668
PAN SKIP MECHANISM
Filed Oct. 2, 1950 5 Sheets-Sheet 1

INVENTOR.
WALTER BAECHLE
BY
Wood, Arey, Herron & Evans.
ATTORNEYS.

March 8, 1955  W. A. BAECHLE  2,703,668
PAN SKIP MECHANISM
Filed Oct. 2, 1950  5 Sheets-Sheet 3
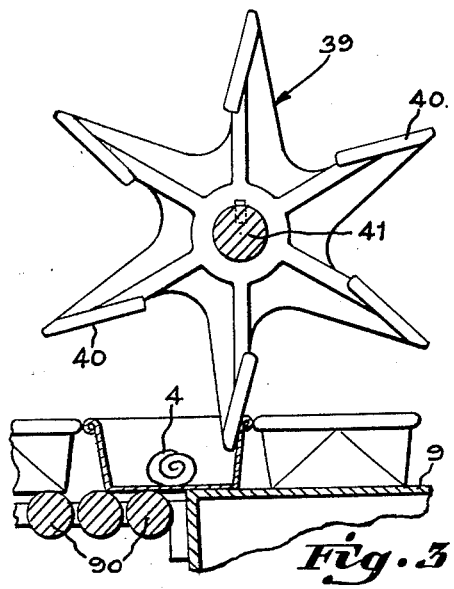
Fig.3
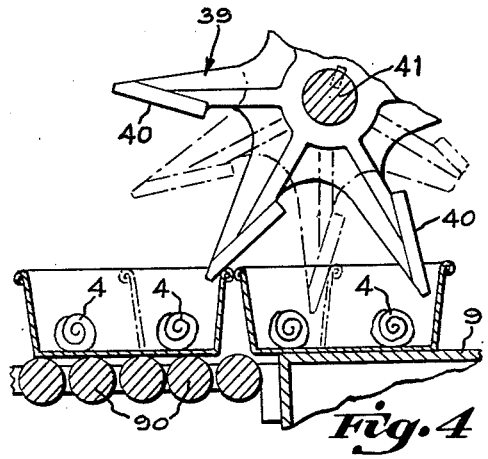
Fig.4
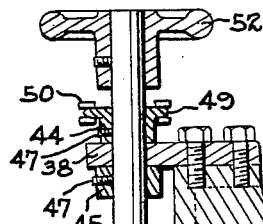
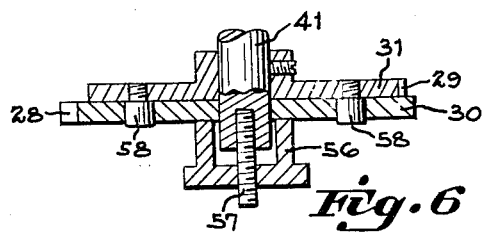
Fig.6
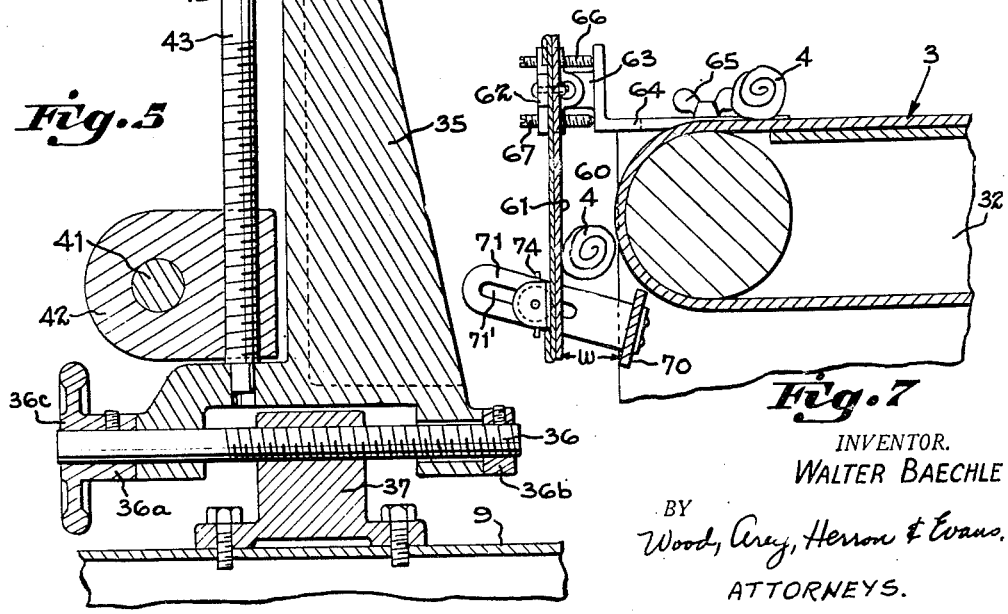
Fig.5  Fig.7
INVENTOR.
WALTER BAECHLE
BY
Wood, Arey, Herron & Evans.
ATTORNEYS.

March 8, 1955 W. A. BAECHLE 2,703,668
PAN SKIP MECHANISM
Filed Oct. 2, 1950 5 Sheets-Sheet 4

INVENTOR.
WALTER BAECHLE.
BY
Wood, Arey, Herron & Evans.
ATTORNEYS.

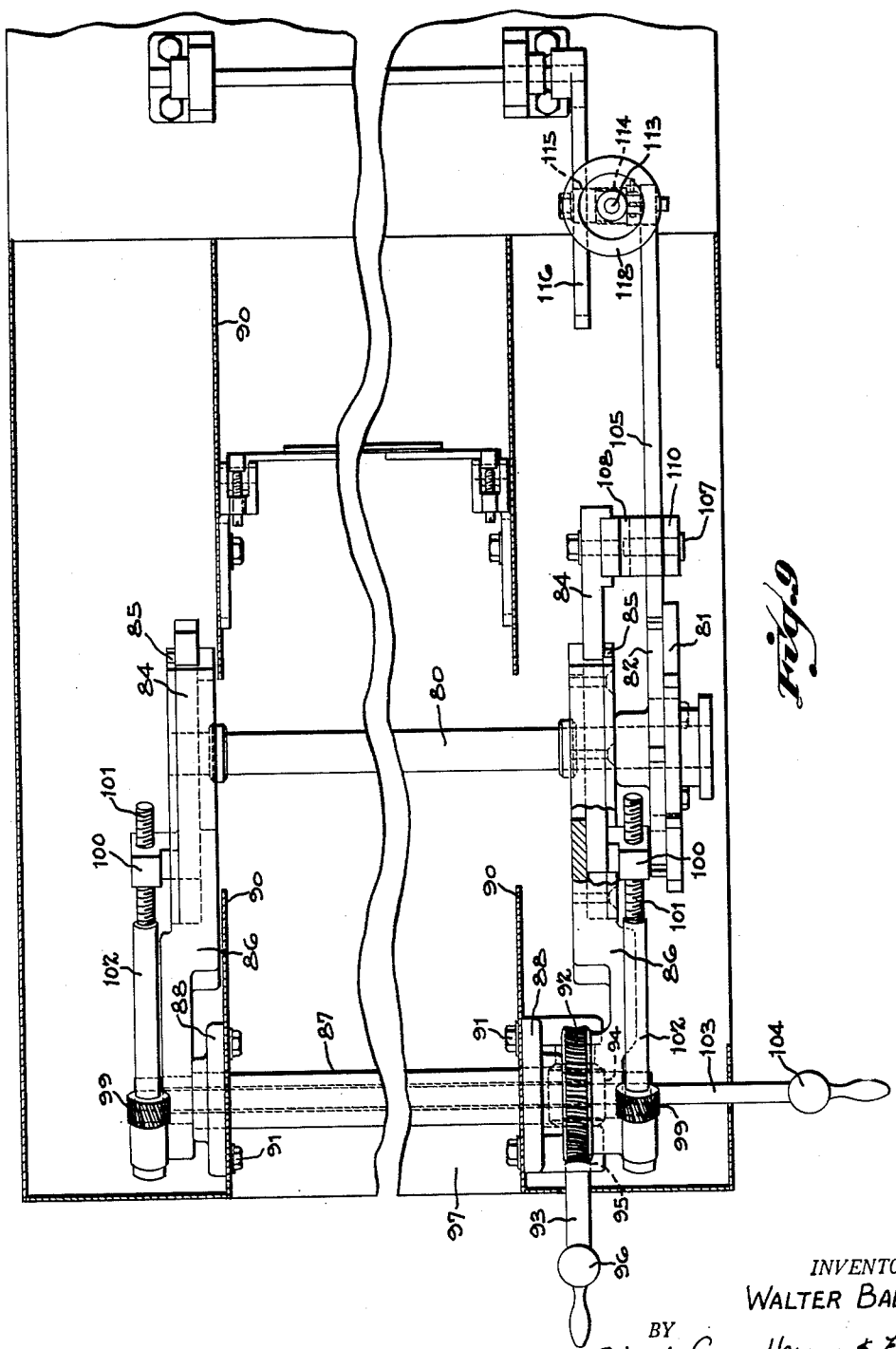

United States Patent Office 2,703,668
Patented Mar. 8, 1955

2,703,668

PAN SKIP MECHANISM

Walter A. Baechle, Cincinnati, Ohio, assignor to The J. H. Day Company, Inc., Cincinnati, Ohio, a corporation of Ohio Application October 2, 1950, Serial No. 188,048

9 Claims. (Cl. 226—2)

This invention relates to machinery for loading bake pans and is particularly directed to an improved mechainsm for automatically positioning the pans to receive one or more lumps of dough being discharged from the end of a conveyor.

The present invention is an improvement over the invention shown in my co-pending application, Serial No. 145,847, filed February 23, 1950, now Patent Number 2,640,637 dated June 2, 1953, which shows, generally, a method of arresting pans moving along a conveyor to allow a lump of dough to be deposited in each pan.

In a commercial bakery, the process of baking bread, rolls, and the like, involves many separate operations such as mixing, shaping, proofing, etc. which are performed by a succession of automatic devices. The dough is transported from machine to machine and finally to the oven by means of various mechanical conveyors. In the early stages of preparation, the dough lumps are often moved directly upon belt conveyors, but before the formed dough lumps can be baked in the oven, they must be placed in bake pans. This invention is concerned with a novel method of depositing dough lumps from a belt conveyor into bake pans.

In a bakery installation utilizing the pan skip mechanism which is the subject of this invention, the dough lumps, after they have been formed into approximate loaf shape by appropriate machines, are placed upon a conveyor belt in such a manner that they advance along it one at a time. Likewise, the empty bake pans are placed on a conveyor belt so that they are propelled tandem fashion; it being the usual practice to assemble the bake pans into groups, that is, four or more individual pans rigidly secured in fixed relation to each other by means of bands to form a group.

The dough lump conveyor is elevated with respect to the pan conveyor and passes directly over it at the dough-loading station where the dough lumps are deposited from the continuously moving dough lump conveyor into bake pans travelling along the continuously moving pan conveyor. The motion of each pan is arrested as it passes the dough-loading station so that one or more lumps of dough may be delivered to the pan as the dough lumps are dropped from the end of the dough conveyor.

It is essential for efficient operation, not only, that each pan receive its load of dough, but also that the dough be accurately positioned within the pan since otherwise a deformed loaf might result. This is especially true where two or more lumps of dough are to be baked in a single pan since if they are not disposed properly within the pan, a "double" or oversized loaf, composed of two dough lumps, might result.

It is also desirable that the conveyors for the dough and pans be of the continuously moving type, both because of the economy in the cost of production and operation of the conveyors and because the vibrations, which are inherent in an intermittently operating mechanism, are thereby avoided. Therefore, in order to arrest the movement of the pans at the dough loading station, some provision must be made to create a relative movement between the continually moving conveyor and the pans.

As shown in my co-pending application, the transfer of dough lumps is effected by means of a dough lump conveyor superimposed upon a pan conveyor, and a skip mechanism actuated by contact with the dough lumps as they are moved toward the discharge end of the dough conveyor. The function of the skip mechanism is to control the movement of each pan as it reaches the loading station; that is, each pan is momentarily held stationary, with the conveyor sliding under it, while the dough is deposited in it. The following lump of dough actuates the trigger mechanism whereby the pans are released and caused to move one space, at which time the movement of the pans is again arrested to allow the trailing lump of dough to be deposited in the arrested pan at the loading station.

The present invention contemplates a pan skip in which the pan arresting mechanism and trigger for actuating it are so arranged that the pans can be arrested to receive one lump of dough or two or more lumps of dough as required. In the case where the mechanism operates to effect the depositing of one lump of dough into a pan, the skip mechanism allows the pans to move a full pan width each time the arresting mechanism is released. In case several loaves of bread are to be baked in a pan, the skip mechanism is adjusted so that the pans move intermittently only a fractional part of a pan width so that two or more lumps of dough may be deposited side by side in the pans.

An object of this invention is to provide a pan skip mechanism which is so designed that it can be adjusted to control the intermittent movement of pans moving tandemwise on a conveyor so that one or more lumps of dough may be accurately deposited in each pan.

Another object of the present invention is to provide a pan skip mechanism that can be adjusted to accommodate pans of various widths and depths and may be adjusted to accurately guide dough lumps of various sizes.

A further object of the present invention is to provide a pan skip mechanism having an adjustable throat for accurately guiding the dough lumps into the intermittently moving pans.

Another object of this invention is to provide a simple, effective means of controlling the number of lumps of dough to be deposited in each pan.

The above and other objects of the invention will be apparent to those skilled in this art from the following description taken in conjunction with the accompanying drawings, in which:

Figure 3 is a view in section taken on line 3—3 of Figure 2 showing the skip wheel and the manner in which it engages the individual pans of a series of pans moving along the pan conveyor.

Figure 4 is a view similar to Figure 3 showing the operation of the skip wheel when the skip mechanism has been adjusted to arrest movement of the individual pans when they have travelled a half pan width to permit the depositing of two dough lumps into each pan.

Figure 5 is a view in section taken on line 5—5 of Figure 2.

Figure 6 is a fragmentary view in section, taken on line 6—6 of Figure 1, showing features of the skip mechanism whereby the motions depicted by Figures 3 and 4 may be effected.

Figure 7 is a view in section taken along line 7—7 of Figure 2, showing the adjustable guide throat, or chute, by means of which each dough lump is accurately guided into the pans below.

Figure 9 is a partial top plan view showing the features of the modified adjusting mechanism for positioning the stop wheel shaft.

Figure 1:
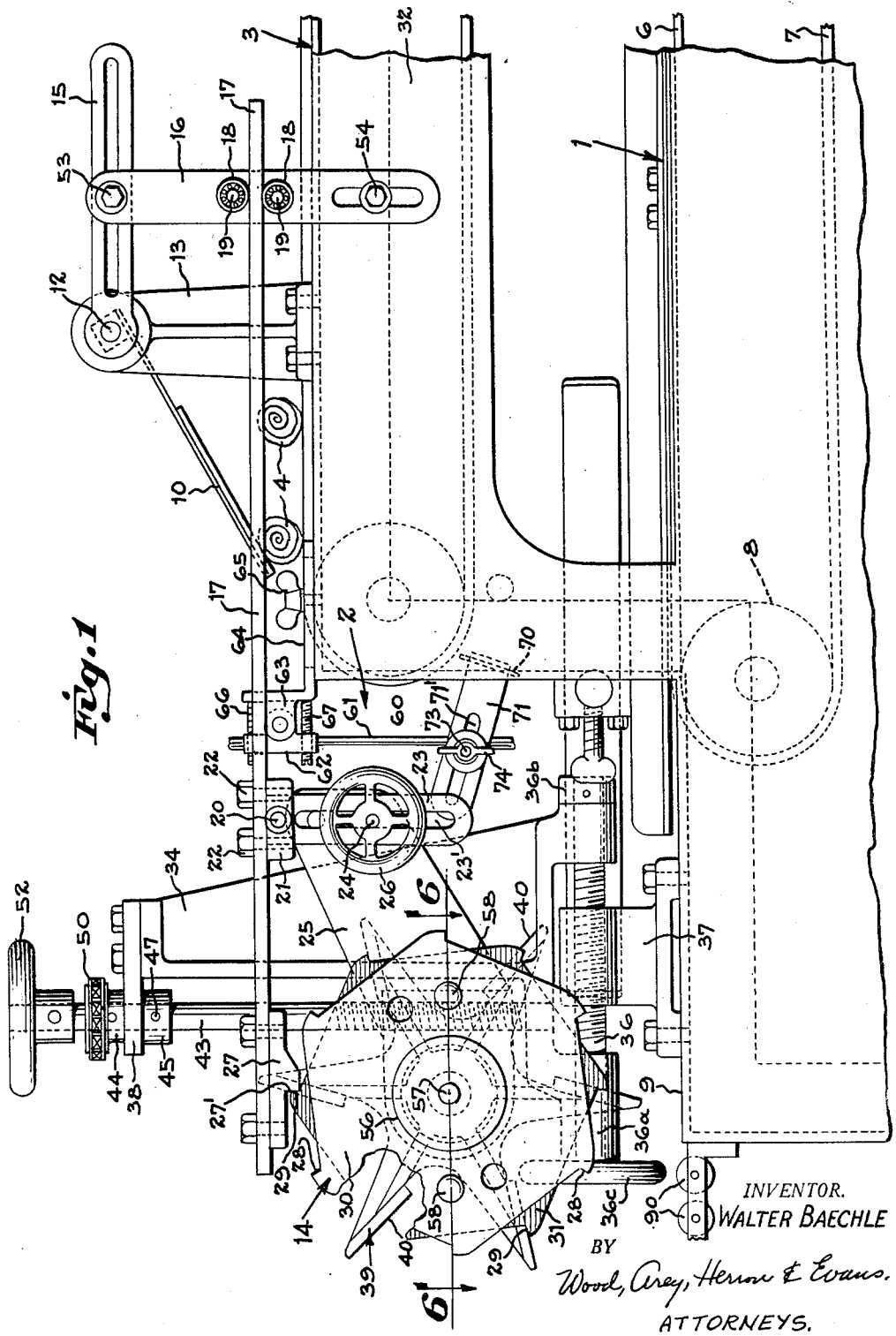
Figure 1 is a view in side elevation of a dough lump conveyor, a bake pan conveyor, and a skip mechanism arranged and constructed in accordance with this invention.

Figure 1 of the drawings shows the arrangement of the bake pan conveyor 1, the dough lump loading station indicated at 2 and the dough lump conveyor 3.

The bake pans, which have been grouped together, that is, rigidly secured in fixed relation with each other by means of bands, move from right to left on conveyor 1 which is shown as comprising an endless belt having upper and lower reaches 6 and 7, passing over a pulley or wheel 8 located at the forward end. When the groups of pans leave the conveyor belt 1, they slide over a platform 9 located forwardly of the wheel or pulley 8. The pans after leaving the platform 9 next travel along that conveyor represented by rollers 90, being pushed along that conveyor by the trailing groups of pans which are being urged forwardly by the conveyor belt 1.

The dough loaves 4 may be formed in any appropriate machine and deposited on the dough conveyor one at a time. As the lumps of dough 4 move along conveyor 3 in spaced relation to each other as shown in Figure 1, each dough lump engages a flap or target 10 which is pivotally supported at its upper end on a shaft 12, the ends of which are journaled in the upper ends of pedestals 13 disposed one on each side of the conveyor 3. The flap or target 10 is lifted and turned clockwise about the shaft 12 by each lump of dough passing under it, and then is returned by gravity towards a vertical position when the lump of dough has passed beyond the free end thereof. Thus, an oscillatory motion is imparted to the target by the succession of lumps of dough passing under it.

The oscillating motion of target 10 is utilized to control the pan skip mechanism 14. The control of pan skip mechanism 14 by target 10 is effected by a lever arm 15, one end of which is secured to shaft 12, a vertically disposed link 16 by means of spaced rollers 18. As shown, the rearward end of lever 17 is disposed between the rollers 18, these being mounted on link 16 by means of bearing pins 19.

Lever 17 is pivotally mounted on a pin 20 journaled in a bearing block 21 which is secured to lever 17 by means such as bolts 22. Bearing block 21 is adjustable vertically by means of a support member 23 preferably integral with the block 21. Support member 23 is provided with a vertical slot 23' through which a bolt 24 extends, the bolt being secured to a bracket 25 which is rigidly supported by the frame work of the skip mechanism 14. The support member 23 may be clamped in position by a clamp wheel 26. A pawl 27 is secured to the forward end of lever 17 having a tooth or dog 27' disposed in position to engage teeth 28 and 29 of ratchet wheels 30 and 31 embodied in the skip mechanism.

As shown in Figure 1, target arm 15 is slotted lengthwise to accommodate a pivot pin 53, means being provided for locking pin 53 to arm 15 at any desired position along the length of the arm to thereby control the angular sweep or movement of lever 17. The lower end of link 16 is slotted to accommodate a guide bolt 54 threaded into a side frame member 32 of conveyor 3.

The skip mechanism 14 includes vertical saddle frame members 34 and 35 which serve as supports for the skip wheel. These supports are disposed on opposite sides of the stationary platform 9 forwardly of the discharge end of conveyor 3. Each saddle frame is supported by a screw 36 and a pedestal 37. Each screw is rotatably mounted in the base of its saddle frame and provided with stop collars 36a and 36b at its opposite ends as shown in Figure 5. As shown, each screw has threaded engagement with its pedestal 37, so that the saddle frame members may be moved towards or away from the discharge end of the dough lump conveyor 3. Screws 36 may be turned by hand wheels 36c with which collars 36c may be integral. The upper ends of the saddle frame members 34 and 35 are tied together by means of cross member 38 which is bolted or otherwise secured to the saddle frame members as shown.

The skip mechanism also includes a skip wheel 39. This wheel as shown in Figures 3 and 4, is similar to a paddle wheel and functions to arrest the forward movement of the bake pans at the time a dough lump is discharged from its conveyor so that each pan is properly positioned to receive the dough. In the specific form illustrated in Figures 3 and 4, the skip wheel includes six paddles 40. The paddle wheel 39 is keyed to a shaft 41, the opposite ends of which are journaled in bearing blocks 42 carried by vertical adjusting screws 43. The upper ends of screws 43 may be journaled in the cross member 38 as shown. As shown, screws 43 have screw-threaded engagement with the bearing blocks 42. The extreme lower ends of the screws 43 are journaled in the saddle frames 34 and 35, as shown in Figure 5.

In order to prevent vertical movement of screws 43 when it is desired to raise or lower the paddle wheel shaft 41, thrust collars 44 and 45 are provided on each screw 43. These collars are located one above and one below the cross member 38 and are secured to the screws by means of set screws 47. The upper thrust collars 44 may have formed integrally therewith sprocket teeth 49 over which a sprocket chain 50 may run so that both screws 43 may be actuated in unison by merely turning one of them. In order that either screw 43 may be turned, each may be provided with a hand wheel 52. By means of screws 43 the paddle wheel 39 may be raised or lowered as required by the depths of the particular bake pans being handled by the machine.

Figure 2:
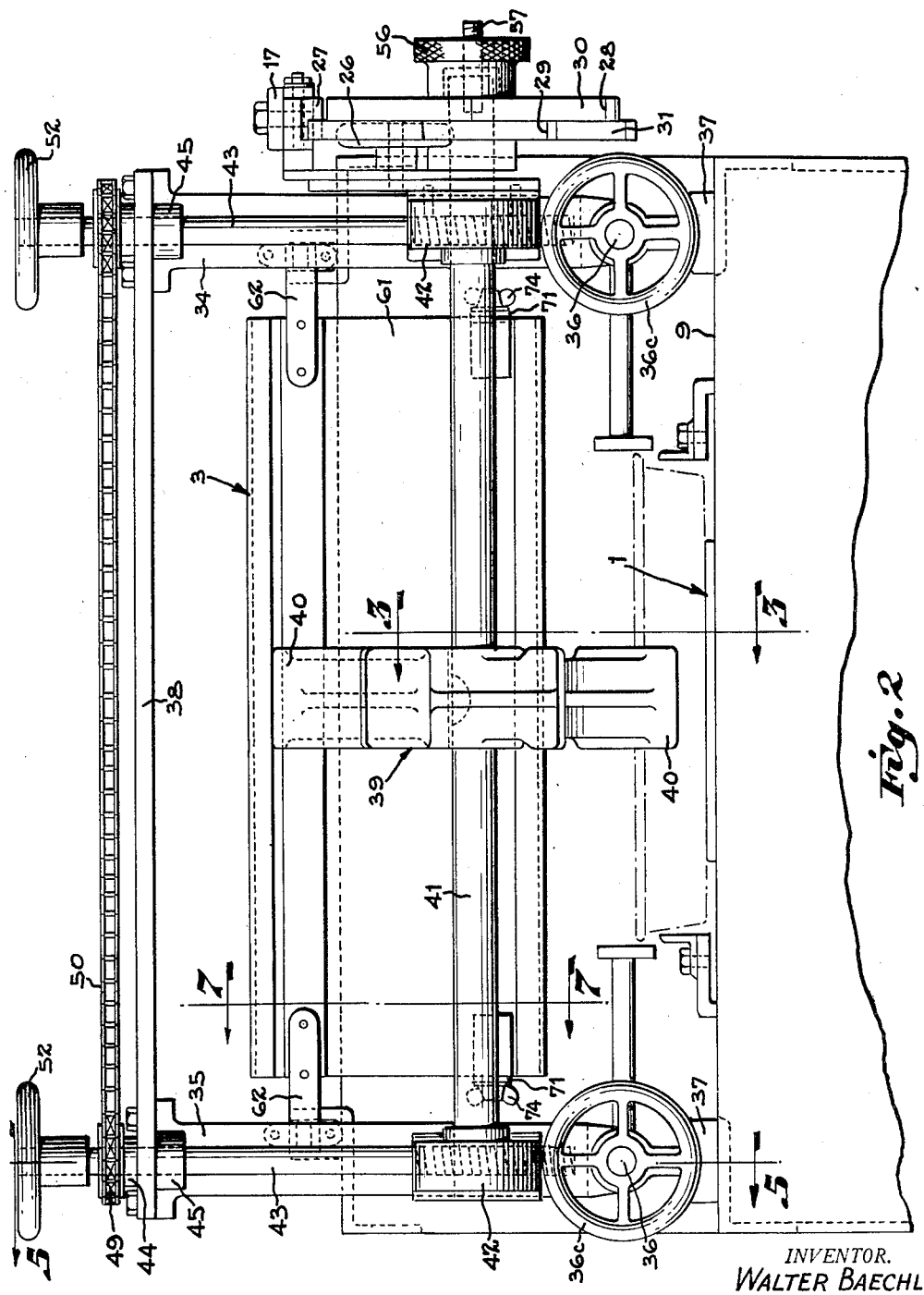
Figure 2 is an end view of the pan skip mechanism as seen looking in the direction of bake pan travel (from right to left in Figure 1).

As shown in Figures 1 and 2, the ratchet wheels 30 and 31 are mounted on one end of the paddle wheel shaft 41, specifically on that end of the shaft which extends outwardly of saddle frame 34. Ratchet wheels 30 and 31 preferably are identical in form, and, as specifically illustrated, each is provided with six teeth 28 and 29, respectively, corresponding in number to the number of paddles 40 on wheel 39. One of these ratchet wheels is secured fast to shaft 41 while the other, namely, the outer wheel 30, is rotatable on the shaft.

In order that the ratchet wheels 30 and 31 may be adjusted to predetermined positions with respect to each other, and to securely lock them together in their adjusted positions so that proper allowance is made for the number of loaves to be deposited in each pan, locating and locking pins 58 are provided (see Figure 6). As shown, pins 58 are threaded into ratchet wheel 31. The heads of pins 58 project outwardly through holes or apertures in the outer ratchet wheel as shown in Figure 6. The outer ratchet wheel is provided with two pairs of holes for accommodating the heads of pins 58 so that the outer ratchet wheel 30 may be rotated to one of two positions relative to ratchet wheel 31. In one position the faces of teeth 28 and 29 will be in alignment; in the other position, teeth 29 are displaced half the distance between adjacent teeth 28. When properly positioned, the ratchet wheels 30 and 31 may be clamped together by means of a clamp nut 56 which is threaded on a stud 57, the stud being threaded into the end of the paddle wheel shaft 41, as shown in Figure 6.

When the ratchet wheels are adjusted to a position where the faces of teeth 28 and 29 are in alignment, the skip mechanism will allow the paddle wheel 39 to make one-sixth (⅙) of a revolution with each oscillation of target 10. If the outer ratchet wheel 30 is shifted a half tooth, teeth 28 and 29 will be out of alignment, as shown in Figure 1, so that the paddle wheel 39 of the skip mechanism will turn one-twelfth (1/12) of a revolution with each oscillation of target 10.

By adjusting screws 36, the skip wheel may be moved toward or away from the discharge end of conveyor 3. It will be noted that the lever 17 is automatically kept in horizontal alignment with the skip wheel shaft, since the lever is pivoted about pin 20 which moves horizontally with the shaft due to the fact that it is joined to the framework of the skip mechanism by means of support member 23 and bracket 25. By turning screws 43, paddle wheel 39 and its shaft may be raised or lowered according to requirements of the depths of pans passing under it. By means of the adjustable bearing 21 for lever 17, the pivot point of lever 17 may be raised or lowered, according to the height of the skip wheel shaft 41.

When a lump of dough passes under target 10, as shown in Figure 1, lever 17 is turned clockwise, that is, the forward end on which pawl 27 is secured is raised, whereby the tooth or dog thereon is disengaged from the tooth of the ratchet wheel with which it may be in engagement, thereby freeing the ratchet wheels so that the pans may move forward through the loading station. As the pans move forward they turn the skip wheel 39 and its shaft 41. If the ratchet wheels 30 and 31 are adjusted so that teeth 28 and 29 are in alignment, paddle wheel 39 will turn one sixth (⅙) of a revolution. If the ratchet wheels are offset with respect to each other, as shown in Figure 1, the paddle wheel 39 will turn one-twelfth (1/12) of a revolution each time a lump of dough passes under target 10. Each time a lump of dough has passed beyond target 10, the lever 17 returns to the position shown in Figure 1, where it can engage a tooth on either or both of the ratchet wheels to arrest movement of the pans.

When the skip mechanism is adjusted to permit rotation of the paddle wheels through one-sixth (⅙) of a revolution per oscillation of the target 10, one lump of dough is accurately disposed in each pan as shown in Figure 3. If the ratchet wheels are adjusted as shown in Figure 1, then the pans will move half a width, whereby two lumps of dough may be deposited in each pan, as shown in Figure 4.

In order to assure accurate depositing of lumps of dough in the pans as they pass through the loading station, an adjustable throat 60 is provided. Adjustable throat 60 comprises a vane or baffle 61 that extends crosswise of the discharge end of conveyor 3, as shown in Figures 2 and 7. Vane 61 is supported adjacent its upper edge at the opposite ends thereof by pins 62 that are journaled in bearings 63 disposed on opposite sides of and secured to the dough lump conveyor frame. The bearings 63, as shown, are of substantially L-shape, the legs 64 of which are clamped to the dough lump conveyor frame by means of a bolt and wing nut 65 whereby bearings 63 may be moved towards or away from the discharge end of conveyor 3.

The angular movement of the vane or baffle 61 may be adjusted by means of screws 66 and 67 disposed one above and one below the pivot pins 62. The ends of these screws are disposed to abut the bearings 63 as shown in Figures 1 and 7. By turning screw 67 in one direction and screw 66 in the opposite direction, the angular position of baffle 16 may be adjusted. The guide throat also includes a baffle or plate 70 which is supported at its opposite ends by brackets 71 secured to the lower end of target 61 at the opposite ends thereof. Brackets 71 are provided with slots 71' through which clamp bolts 73 extend, wing nuts 74 being provided for clamping each bracket 71 in its desired position. By adjusting brackets 71, the space or width W of the throat may be adjusted to accommodate the size of the dough lump being handled by the machine. By means of the slotted bracket arms 71 and the bolt and wing nuts above described, the angle of the bracket arms and consequently the taper of the throat may be adjusted. It is thus possible to adjust the throat with reference to the location of a bread pan that a lump of dough discharging from the conveyor as shown in Figure 7 will automatically be deposited into the pan at the desired spot.

Figure 8:
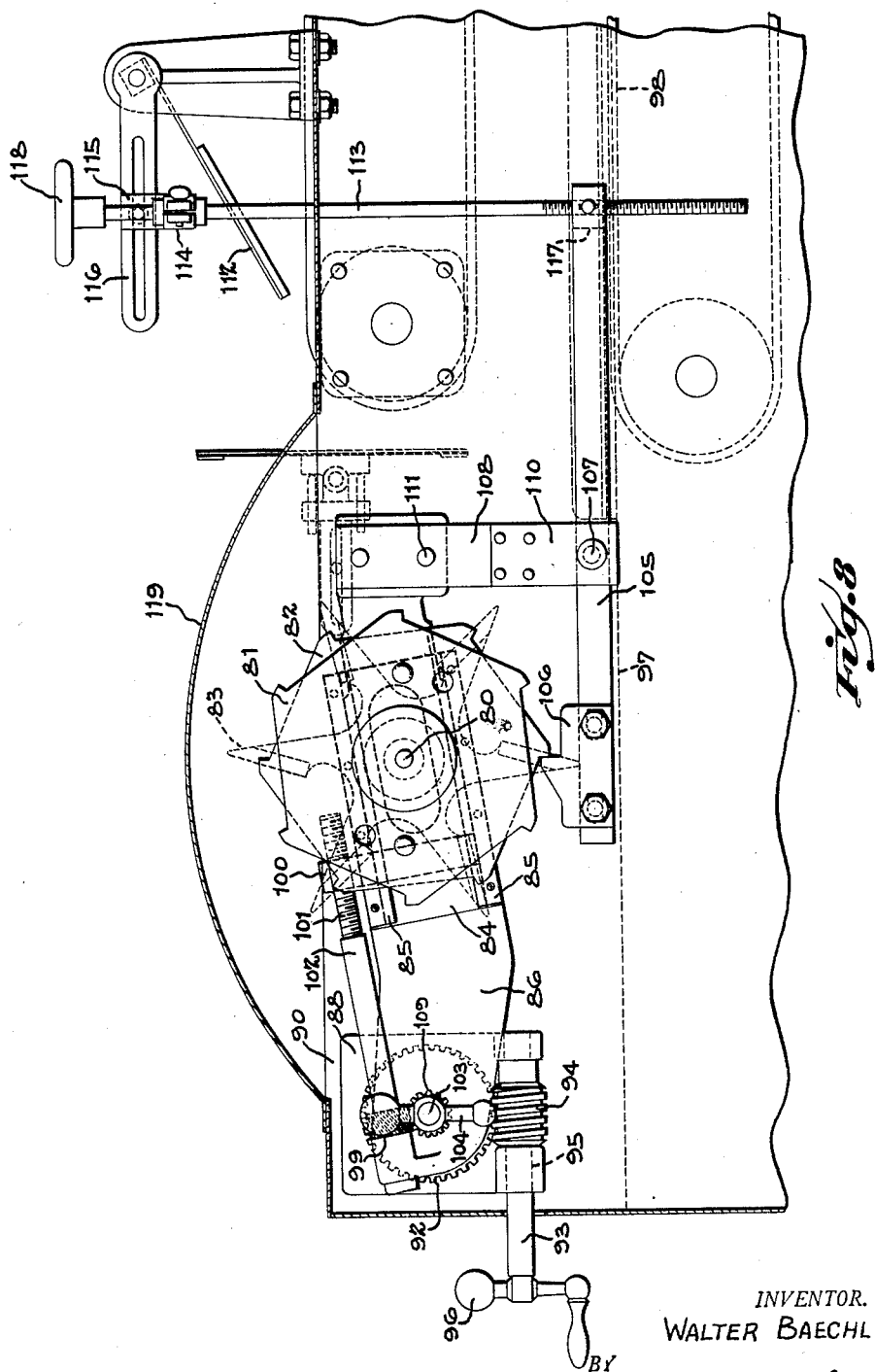
Figure 8 is a side elevational view of a modification of the pan skip mechanism with the housing broken away.

The modified embodiment of the pan skip mechanism as shown in Figures 8 and 9 differs from the embodiment already described principally in the method of positioning the paddle wheel shaft and the mounting of the lever carrying the pawl. The stop wheel action and the ratchet construction are identical with the construction previously described.

As shown in Figure 8, the main shaft 80 carries the ratchet wheels 81 and 82 and the stop wheel 83. Each end of the shaft 80 is journaled in positioning bars 84 which in turn are slidably carried in the channels 85 provided in the pivot arms 86.

The arms 86 are pivotally supported on each end of the hollow shaft 87 which is journaled in bosses 88 which are joined to the housing 90 as by bolts 91. The arms 86 and shaft 87 are locked together as by a key to prevent relative rotative movement between the two.

A gear wheel 92 is also mounted upon the shaft 87 and is secured to it as by a key and keyway arrangement. One boss 88 is provided with openings 95, through which the drive shaft 93 carrying the worm gear 94 adapted to engage the gear wheel 92, is journaled. A handle 96 is provided to permit the drive shaft to be more easily turned. It can be seen that by turning the handle 96 the worm wheel 94 drives the gear 92, turning the hollow shaft 87 and the arms 86. Thus by turning the crank or handle 96 the height of the main shaft may be raised or lowered to accommodate pans of various depths.

Means are also provided to compensate for varying pan widths by adjusting the main shaft carrying the paddle wheel 83 along the line of movement of the pans which are being pushed along the loading surface 97 by the belt 98.

The means for effecting the horizontal adjustment in the position of the main shaft comprise flanges 100 formed on the positioning bars 84. The flanges are engaged with positioning screws 101 which are supported in tubes 102 joined or made integral with the pivot arms 86. The positioning screws 101 are provided with gears 99 which are locked to rotate with the screws. These gears 99 mesh with other gears 109 secured to a second drive shaft 103 carried within the hollow shaft 87. A crank handle 104 is provided to turn the second drive shaft. When the crank handle is turned the drive shaft causes the positioning screws 101 to rotate and the positioning bars 84 are forced inwardly or outwardly along the screw 101 and within the channel 85 provided in the pivot arms 86. Since the main shaft is journaled in the positioning bars, it also moves outwardly or inwardly in accordance with the movement of the positioning bars and hence horizontal adjustment of the main shaft and paddle wheel is effected.

As shown in Figure 8 the trip lever arrangement also differs from that shown in the embodiment previously described. The trip lever 105 carries a pawl 106 which engages the ratchet wheels 81 and 82 to control the rotation of the stop wheel 83. The trip lever 105 is pivotally supported by pin 107 carried by the link 108 and supporting strip 110. The link 108 is in turn secured to an extension of the positioning bar 84 as by bolts 111. It will be noted that the pivot point 107 automatically moves outwardly and inwardly along the line of travel of the bake pans with the main shaft 80 since both are supported by the positioning bars 84. Hence, no means for adjusting the pawl relative to the main shaft along the line of pan travel need be provided.

Means are, however, provided whereby the amount which the pawl 106 moves as the target 112 oscillates as well as the relative vertical position of the pawl 106 and main shaft 80 may be regulated. These means comprise a rod 113 which is journaled in a block 114 which is pivotally mounted on a hanger 115 bolted to the lever arm 116. The lower end of the rod 113 threadably engages a second block 117 which is pivotally mounted upon the lever arm 105 carrying the pawl 106. Thus, by turning the wheel 118, the end of the trip lever 105 is either raised or lowered altering the vertical relationship of the pawl 106 with the main shaft 80. Also, it is apparent that by moving the hanger 115 along the lever arm 116 the amount which the rod 113 and hence the lever 105 and pawl 106 move each time the target oscillates can be governed.

A cover 119 is fastened to the housing to enclose the pan skip mechanism and protect it from dirt, etc. It can readily be seen that the embodiment just described permits the controls for regulating the position of the shaft carrying the stop wheel to be made very compact. Furthermore, the controls may be located in a convenient position yet one which is not in the operator's way. Thus, they are less subject to accidental blows or pressures which might alter the desired adjustments.

From the foregoing description it will be apparent to those skilled in this art, that various modifications and changes may be made therein without departing either from the spirit or the scope of the invention.

Having described my invention, I claim:

1. In a mechanism for loading bake pans having a continuously moving conveyor for carrying a series of dough lumps and a continuously moving conveyor for supporting a series of bake pans into which said lumps of dough are deposited, a shaft, a stop mounted upon said shaft for successively arresting the movement of each of said pans on said moving conveyor to receive one or more lumps of dough, said stop being actuated by a ratchet wheel mechanism comprising, a plurality of ratchet wheels, each having the same number of teeth, one of said wheels being fast on said shaft and the other being rotatable thereon, and means for adjusting the latter of said ratchet wheels with respect to the other whereby the effective number of teeth on said ratchet wheel mechanism may be selectively changed from the number of teeth on one wheel to the number of teeth on both wheels.

2. In a mechanism for controlling the movement of bake pans on a conveyor with respect to the delivery of lumps of dough to said pans by another conveyor, a shaft, a skip wheel mounted upon said shaft, said skip wheel being provided with a plurality of arms adapted to engage said pans, means for effecting vertical adjustment of said skip wheel according to the depth of the pans engaging the same, said means comprising a frame member adjacent each end of said shaft, a vertical screw journaled in each frame member, and a shaft bearing threadably engaging each screw, said skip wheel shaft being journaled in said bearings whereby said screws are effective to raise and lower said skip wheel shaft.

3. In a mechanism for loading bake pans, having a continuously moving conveyor for carrying a series of dough lumps and a continuously moving conveyor for supporting a series of bake pans into which said lumps of dough are deposited, a shaft, a skip wheel mounted upon said shaft for successively arresting the movement of each of said pans on said moving conveyor to receive one or more lumps of dough, a support for said skip wheel shaft, said support comprising a frame member adjacent each end of said shaft, a vertical screw journaled in each frame member, a shaft bearing in threaded engagement with each screw, said skip wheel shaft being journaled in said bearings, said screws being effective to raise and lower said skip wheel shaft, and means for moving said side frame members longitudinally of the line of travel of the bake pans toward or away from the dough lump conveyor.

4. In a mechanism for loading bake pans, the combination of, a continuously moving conveyor for carrying a series of dough lumps, a continuously moving conveyor for supporting a series of bake pans into which said lumps of dough are deposited, a shaft, a skip wheel mounted upon said shaft for successively arresting the movement of each of said pans on said moving conveyor to receive one or more lumps of dough, means operable by a lump of dough for actuating said skip wheel to release said pan whereby it will be conveyed from the dough receiving position, said means comprising a pair of ratchet wheels each having an equal number of uniformly spaced teeth, said wheels being adapted for adjustment relative to each other so that the number of effective teeth may be equal to the number of teeth on a single wheel or to twice that number, a pivotally supported lever having a pawl thereon adapted to engage said teeth, and a swinging target connected to said lever and actuated by a dough lump approaching the discharge end of the conveyor, for disengaging the pawl from a ratchet wheel tooth whereby the skip wheel shaft can turn until arrested by engagement of the pawl and the next following ratchet tooth.

5. In a mechanism for loading bake pans having a continuously moving conveyor for carrying a series of lumps of dough and a continuously moving conveyor for supporting a series of bake pans into which said dough lumps are deposited, a shaft, a skip wheel mounted upon said shaft for successively arresting the movement of each of said pans on said moving conveyor to receive one or more lumps of dough, a support for said skip wheel shaft, said support comprising a pair of pivotally mounted arms, positioning bars carried by said arms, said shaft being journalled in said positioning bars, means for causing said arms to be rotated about said pivot whereby the shaft is raised or lowered.

6. In a mechanism for loading bake pans having a continuously moving conveyor carrying a series of lumps of dough and a continuously moving conveyor for supporting a series of bake pans into which said dough lumps are deposited, a shaft, a skip wheel mounted upon said shaft for successively arresting the movement of each of said pans on said moving conveyor, to receive one or more lumps of dough, means for moving said shaft longitudinally of the line of travel of the bake pans toward or away from the dough lump conveyor, said means comprising a pair of pivotally mounted arms, positioning bars slidably carried by said arms, positioning screws carried by said arms and threadably engaging said positioning bars, means for causing said positioning screws to be rotated whereby said positioning bars are caused to slide along said pivoted arms whereby said shaft is adjusted along the line of travel of the bake pans.

7. In a mechanism for loading bake pans having a continuously moving conveyor for carrying a series of dough lumps and a continuously moving conveyor for supporting a series of bake pans into which said lumps of dough are to be deposited, a shaft, a skip wheel mounted upon said shaft for successively arresting the movement of each of said pans on said moving conveyor to receive one or more lumps of dough, means for effecting vertical and longitudinal adjustment of said skip wheel shaft in the line of travel of the bake pans toward or away from the dough lump conveyor, said means comprising, a pair of arms pivotally supported adjacent one end thereof, positioning bars slidably carried by said arms, said shaft being journaled in said positioning bars, means for causing said arms to rotate about said pivot point whereby the height of the shaft is raised or lowered, positioning screws carried by said arms and threadably engaging said positioning bars, means for rotating said screws whereby the positioning bars are caused to move along the arms effecting a longitudinal adjustment of the position of said shaft.

8. In a mechanism for loading bake pans having a continuously moving conveyor for carrying a series of lumps of dough, and a continuously moving conveyor for supporting a series of bake pans into which said dough lumps are deposited, the combination of a frame, a shaft mounted on said frame, a skip wheel mounted on said shaft, said skip wheel having a plurality of arms adapted to engage said pans for successively arresting the movement of each of said pans on said moving conveyor, means for effecting vertical adjustment of said shaft in accordance with the depth of the pans engaging said skip wheel, a ratchet wheel mounted on said shaft, a lever having a pawl thereon adapted to engage said ratchet wheel, said lever being pivotally mounted to a support member at a pivot point, and means for raising and lowering said pivot point in accordance with the height of said shaft.

9. In a mechanism for loading bake pans having a continuously moving conveyor for carrying a series of lumps of dough, and a continuously moving conveyor for supporting a series of bake pans into which said dough lumps are deposited, the combination of a frame, a shaft mounted on said frame, a skip wheel mounted on said shaft, said skip wheel having a plurality of arms adapted to engage said pans for successively arresting the movement of each of said pans on said moving conveyor, means for effecting vertical adjustment of said shaft in accordance with the depth of the pans engaging said skip wheel, a ratchet wheel mounted on said shaft, a lever having a pawl thereon adapted to engage said ratchet wheel, said lever being pivotally mounted to a support member at a pivot point, means for raising and lowering said pivot point in accordance with the height of said shaft, and means for adjusting the position of said shaft longitudinally of the line of travel of the pans.

References Cited in the file of this patent

UNITED STATES PATENTS

| | | |
|---|---|---|
| 557,648 | Bradley | Apr. 7, 1896 |
| 1,671,700 | Clarin et al. | May 29, 1928 |
| 2,536,249 | Archer | Jan. 2, 1951 |